US012272311B2

(12) United States Patent
Lee et al.

(10) Patent No.: US 12,272,311 B2

(45) Date of Patent: Apr. 8, 2025

(54) DISPLAY DEVICE CAPABLE OF SUBPIXEL COMPENSATION BASED ON SENSING THROUGH LOW-POTENTIAL VOLTAGE LINE AND METHOD OF DRIVING THE SAME

(71) Applicant: LG Display Co., Ltd., Seoul (KR)

(72) Inventors: Jin Woo Lee, Paju-si (KR); Kyung Hyun Lim, Paju-si (KR); Ji Su Choi, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/517,244

(22) Filed: Nov. 22, 2023

(65) Prior Publication Data

US 2024/0221655 A1 Jul. 4, 2024

(30) Foreign Application Priority Data

Dec. 16, 2022 (KR) ........................ 10-2022-0177085

(51) Int. Cl.
*G09G 3/3233* (2016.01)

(52) U.S. Cl.
CPC ... *G09G 3/3233* (2013.01); *G09G 2300/0413* (2013.01); *G09G 2300/0426* (2013.01); *G09G 2300/0842* (2013.01); *G09G 2320/0223* (2013.01); *G09G 2320/0693* (2013.01)

(58) Field of Classification Search
CPC ... G09G 3/32–3291; G09G 2300/0404; G09G 2300/0413; G09G 2300/0426; G09G 2300/043; G09G 2300/0819; G09G 2300/0842; G09G 2310/0243; G09G 2310/0248; G09G 2310/0251; G09G 2310/027–0275; G09G 2310/06; G09G 2310/08; G09G 2320/0233; G09G 2320/0242; G09G 2320/04; G09G 2320/043; G09G 2320/045; G09G 2320/0693
See application file for complete search history.

(56) References Cited

U.S. PATENT DOCUMENTS

| | | | | |
|---|---|---|---|---|
| 11,817,058 B2 * | 11/2023 | Hong | G09G 3/3258 | |
| 2007/0242002 A1 * | 10/2007 | Kawabe | G09G 3/3233 | 345/76 |
| 2009/0140959 A1 * | 6/2009 | Nam | G09G 3/325 | 345/76 |
| 2019/0051250 A1 * | 2/2019 | Lee | G09G 3/3233 | |
| 2023/0125796 A1 * | 4/2023 | Baek | G09G 3/2007 | 345/212 |
| 2023/0209934 A1 * | 6/2023 | Kim | G09G 3/3275 | 345/204 |

* cited by examiner

*Primary Examiner* — Nathan Danielsen
(74) *Attorney, Agent, or Firm* — Fish & Richardson P.C.

(57) ABSTRACT

The present disclosure provides a display device including a first subpixel configured to emit light and a second subpixel; a high-potential voltage line connected to the first subpixel and the second subpixel to deliver a high-potential voltage; a low-potential voltage line connected to the first subpixel and the second subpixel configured to deliver a low-potential voltage; and a circuit connected to the low-potential voltage line and configured to sense a value corresponding to the low-potential voltage line during operation of the second subpixel and compensate for a data signal to be supplied to the first subpixel based on the value.

16 Claims, 16 Drawing Sheets

DISPLAY DEVICE CAPABLE OF SUBPIXEL COMPENSATION BASED ON SENSING THROUGH LOW-POTENTIAL VOLTAGE LINE AND METHOD OF DRIVING THE SAME

This application claims the benefit of Korean Patent Application No. 10-2022-0177085, filed on Dec. 16, 2022, which is hereby incorporated by reference as if fully set forth herein.

BACKGROUND

Technical Field

The present disclosure relates to a display device and a method of driving the same.

Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) are increasingly used.

The above display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals, for example, a scan signal and a data signal, a selected one thereof may transmit light therethrough or may directly emit light, thereby displaying an image.

SUMMARY

Accordingly, the present disclosure is directed to a display device and a method of driving the same that substantially obviate one or more problems due to limitations and disadvantages of the related art.

The present disclosure senses current or voltage flowing through a low-potential voltage line and compensates a data signal based thereon to equalize display quality across a display panel and minimizes a display quality degradation that may be caused by a resistance deviation.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a first subpixel configured to emit light and a second subpixel configured not to emit light, a high-potential voltage line connected to the first subpixel and the second subpixel to deliver a high-potential voltage, a low-potential voltage line connected to the first subpixel and the second subpixel to deliver a low-potential voltage, and a circuit connected to the low-potential voltage line. The circuit senses the low-potential voltage line during operation of the second subpixel and compensates for a data signal to be supplied to the first subpixel based on a sensed value acquired through sensing.

The second subpixel may have a structure in which an anode layer and a cathode layer included in an organic light-emitting diode are short-circuited.

The second subpixel may have a driving transistor turned on in response to a sensing data voltage and a dummy scan signal.

When the driving transistor included in the second subpixel is turned on, the high-potential voltage applied through the high-potential voltage line may be transferred to the low-potential voltage line.

The second subpixel may be located in a non-active area of a display panel and disposed in a line shape in a direction of a gate line.

The circuit may compensate for the data signal in response to an amount of change in the low-potential voltage according to a current resistance (IR) for each position of a display panel based on the sensed value acquired through the low-potential voltage line.

During a sensing operation of the circuit, instead of the low-potential voltage applied through the low-potential voltage line being blocked, the high-potential voltage applied to the second subpixel may be transferred through the low-potential voltage line.

In another aspect of the present disclosure, a method of driving a display device including a display panel including a first subpixel configured to emit light and a second subpixel configured not to emit light, and a circuit configured to sense a low-potential voltage line connected to the first subpixel and the second subpixel includes applying a sensing data voltage and a dummy scan signal to the second subpixel, sensing the low-potential voltage line connected to the first subpixel and the second subpixel, and compensating for a data signal to be supplied to the first subpixel based on a sensed value acquired through the low-potential voltage line.

During a sensing operation of the circuit, instead of the low-potential voltage applied through the low-potential voltage line being blocked, a high-potential voltage applied through the second subpixel may be transferred through the low-potential voltage line.

The compensating may include compensating for the data signal in response to an amount of change in the low-potential voltage according to an influence of IR for each position of the display panel based on the sensed value.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect (s) of the disclosure and together with the description serve to explain the principle of the disclosure. In the drawings.

DETAILED DESCRIPTION

Reference will now be made in detail to the preferred aspects of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, an extended reality (XR) headset or device, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example of the display device according to the present disclosure.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier flows from the source based on a voltage applied to the gate. The drain is an electrode through which a carrier exits the TFT. That is, in the TFT, a carrier flows from the source to the drain.

In the case of the p-type TFT, the carrier is a hole and a source voltage is higher than a drain voltage so that the hole may flow from the source to the drain. In the p-type TFT, a hole flows from the source to the drain side, and thus current flows from the source to the drain side. In contrast, in the case of the n-type TFT, since the carrier is an electron, the source voltage is lower than the drain voltage and an electron may flow from the source to the drain. In the n-type TFT, an electron flows from the source to the drain side, and thus current flows from the drain to the source side. However, the source and the drain of the TFT may be changed depending on the applied voltage. In the following description, one of the source and drain will be described as a first electrode, and the other of the source and drain will be described as a second electrode.

Figure 1:
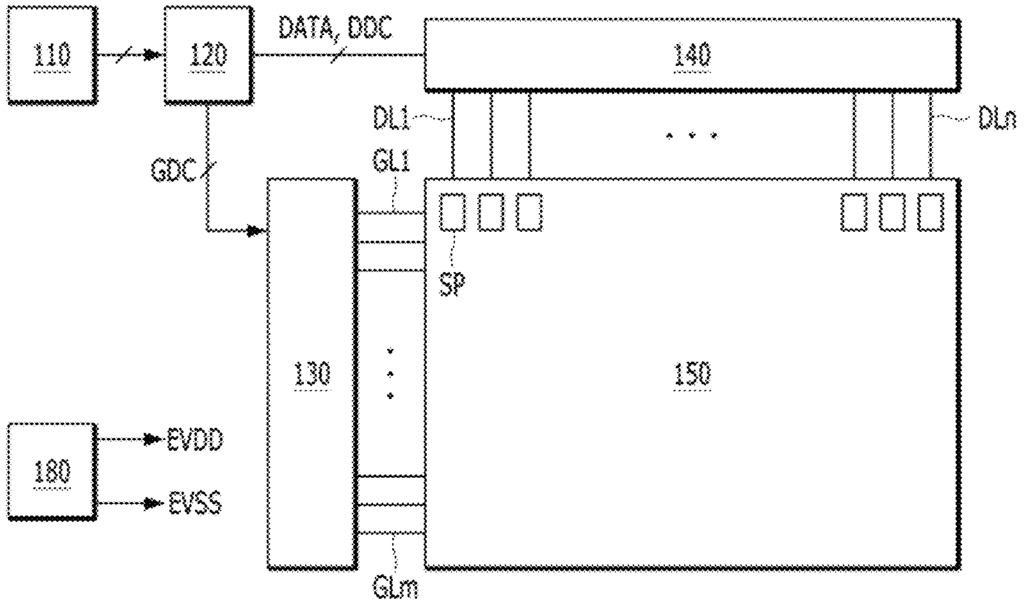
FIG. 1 is a block diagram schematically illustrating an LED device.
Figure 2:
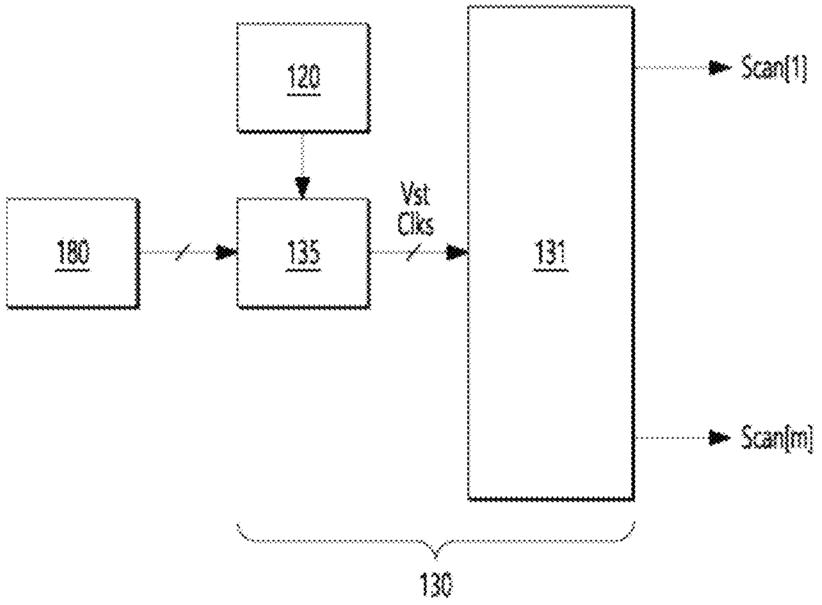
FIGS. 2 and 3 are diagrams for describing a configuration of a gate-in-panel (GIP) type scan driver.
Figure 3:
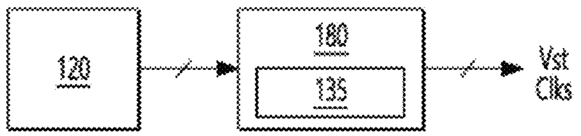
Figure 4:
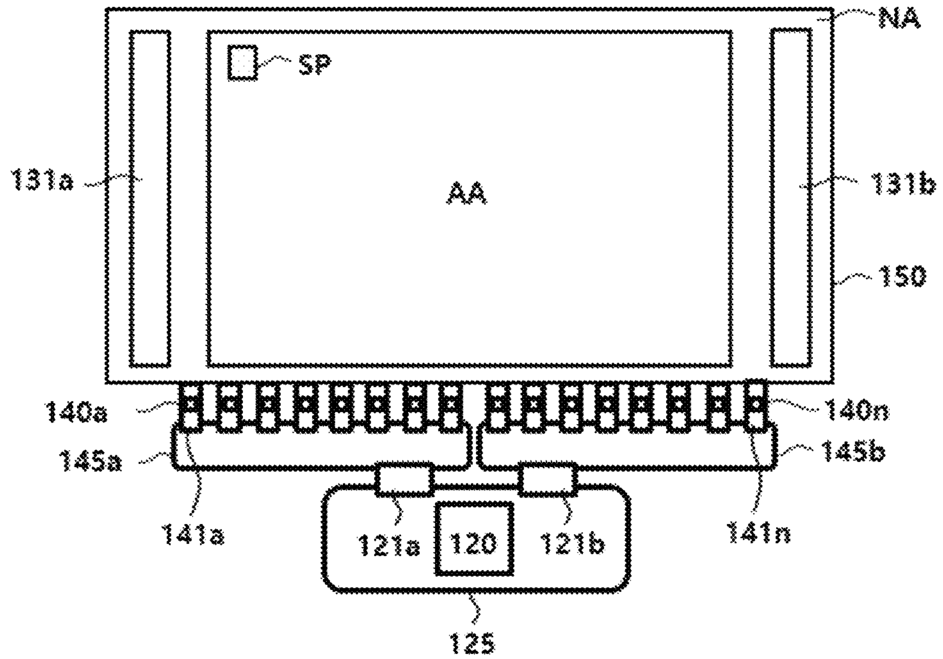
FIG. 4 is a module configuration diagram of the LED device.

FIG. 1 is a block diagram schematically illustrating an LED device, FIGS. 2 and 3 are diagrams for describing a configuration of a GIP type scan driver, and FIG. 4 is a module configuration diagram of the LED device.

As illustrated in FIG. 1, the LED device may include an image supply 110, a timing controller 120, a scan driver 130, a data driver 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC to control the operation of the scan driver 130, a data timing control signal DDC to control the operation of the data driver 140, and various synchronization signals (a vertical synchronization signal VSYNC and a horizontal synchronization signal HSYNC). The timing controller 120 may supply a data signal DATA from the image supply 110 together with the data timing control signal DDC to the data driver 140. The timing controller 120 may be an integrated circuit (IC) and be mounted on a printed circuit board, but is not limited thereto.

The scan driver 130 may output a scan signal (or scan voltage) in response to the gate timing control signal GDC from the timing controller 120. The scan driver 130 may supply the scan signal to subpixels included in the display panel 150 through gate lines GL1 to GLm. The scan driver 130 may be an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the subpixels included in the display panel 150 through data lines DL1 to DLn. The data driver 140 may be an IC and be mounted on the display panel 150 or on the printed circuit board, but is not limited thereto.

The power supply 180 may generate a high-potential voltage and a low-potential voltage based on an external input voltage from the outside and output the high-potential voltage and the low-potential voltage through a high-potential voltage line EVDD and a low-potential voltage line EVSS. The power supply 180 may generate and output the high-potential voltage, the low-potential voltage, and other voltages for powering the various components. For example, the power supply 180 may generate a voltage (for example, a gate high potential and a gate low voltage) for driving the scan driver 130 or a voltage (for example, a drain voltage and a half drain voltage) required for driving the data driver 140.

The display panel 150 may display an image based on a driving signal including a scan signal and a data voltage, a high-potential voltage, a low-potential voltage, etc. Subpixels of the display panel 150 may directly emit light. The display panel 150 may be manufactured based on a rigid or flexible substrate. Non-limiting examples of a substrate include glass, silicon, polyimide, etc. In addition, subpixels emitting light may include pixels including red, green, and blue or pixels including red, green, blue, and white. For example, one subpixel SP may be connected to the first data line DL1, the first gate line GL1, the high-potential voltage line EVDD, and the low-potential voltage line EVSS.

The timing controller 120, the scan driver 130, the data driver 140, etc., have been described as having individual configurations for purposes of illustration. In some cases, one or more of the timing controller 120, the scan driver 130, and the data driver 140 may be integrated into one IC depending on the implementation scheme of the LED device.

FIGS. 2 and 3 illustrate an example of the GIP-type scan driver 130, which may include a shift register 131 and a level shifter 135. The level shifter 135 may generate scan clock signals Clks, a start signal Vst, etc. based on signals and voltages output from the timing controller 120 and the power supply 180.

The shift register 131 may operate based on the signals Clks and Vst, etc. output from the level shifter 135, and output scan signals Scan[1] to Scan[m] for turning on or turning off transistors formed on the display panel. The shift register 131 may be a thin film on the display panel and formed using a GIP method.

Unlike the shift register 131, the level shifter 135 may independently be an IC or may be included in the power supply 180. However, this is merely one example, and the level shifter 135 is not limited thereto.

FIG. 4 illustrates the display panel 150 including an active area AA in which images are displayed and a non-active area NA in which images are not displayed. The subpixels SP may be located in the active area AA. Shift registers 131*a* and 131*b* may be disposed in the non-active area NA and configured to output scan signals from the GIP type scan driver.

The display panel 150 may include a plurality of data drivers 140*a* to 140*n* mounted on a plurality of first circuit boards 141*a* to 141*n* and the timing controller 120 mounted on a control board 125. The plurality of data drivers 140*a* to 140*n* and the timing controller 120 may be electrically connected by at least two second circuit boards 145*a* to 145*b* and at least two cables 121*a* to 121*b*. The plurality of first circuit boards 141*a* to 141*n* may be flexible circuit boards, and the at least two second circuit boards 145*a* to 145*b* may be printed circuit boards. However, the module configuration diagram illustrated in FIG. 4 is only for illustration purposes, and the present disclosure is not limited thereto.

Figure 5:
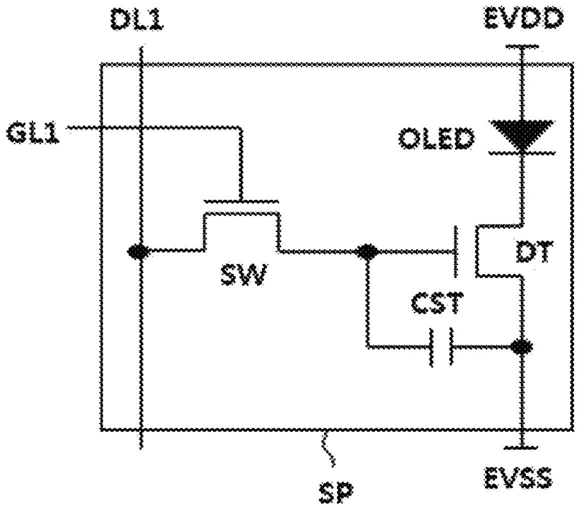
FIG. 5 is an illustrative circuit configuration diagram of a subpixel according to a first aspect of the present disclosure.
Figure 6:
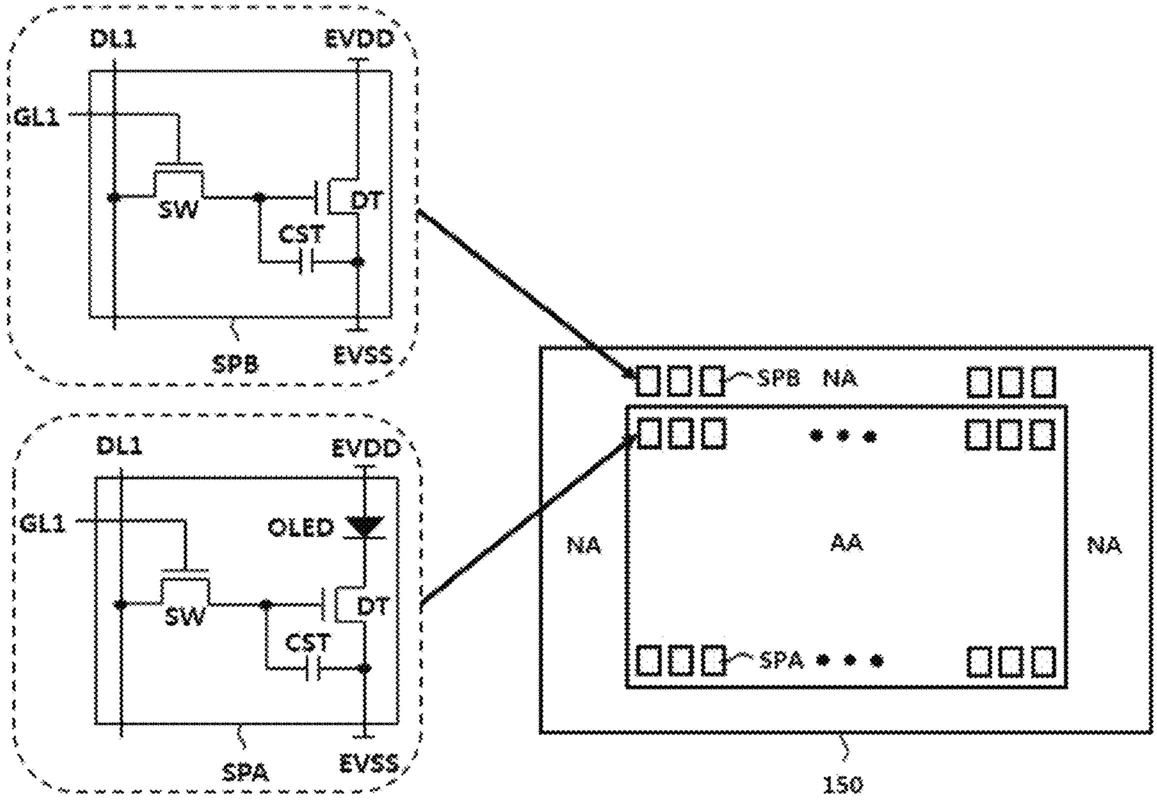
FIG. 6 is a configuration diagram of a subpixel of a display panel according to the first aspect of the present disclosure.

FIG. 5 is an illustrative circuit configuration diagram of a subpixel according to a first aspect of the present disclosure, and FIG. 6 is a configuration diagram of a subpixel of a display panel according to the first aspect of the present disclosure.

As illustrated in FIG. 5, a subpixel SP according to the first aspect may include a switching transistor SW, a capacitor CST, a driving transistor DT, and an organic light-emitting diode OLED.

The switching transistor SW may have a gate electrode connected to the first gate line GL1, a first electrode connected to an Nth data line DLn, and a second electrode connected to a gate electrode of a driving transistor DT. The switching transistor SW may transfer a data voltage applied through a first data line DL1 to a first electrode of the capacitor CST.

The capacitor CST may have the first electrode connected to the gate electrode of the driving transistor DT, and a second electrode connected to a second electrode of the driving transistor DT and the low-potential voltage line EVSS. The capacitor CST may store a data voltage for driving the driving transistor DT.

The driving transistor DT may have the gate electrode connected to the first electrode of the capacitor CST, the first electrode connected to a cathode of the organic light-emitting diode OLED, and the second electrode connected to the low-potential voltage line EVSS. The driving transistor DT may generate a driving current in response to a data voltage stored in the capacitor CST.

The organic light-emitting diode OLED may have an anode connected to the high-potential voltage line EVDD and a cathode connected to the first electrode of the driving transistor DT. The organic light-emitting diode OLED may emit light in response to operation (e.g., based on a driving current) of the driving transistor DT.

As illustrated in FIG. 6, a display panel 150 according to the first aspect may include two types of subpixels SPA and SPB. A type 1 subpixel SPA (e.g., a first subpixel) includes an organic light-emitting diode OLED and is capable of emitting light. A type 2 subpixel SPB (e.g., a second subpixel) does not include an organic light-emitting diode OLED and cannot emit light. As such, the type 1 subpixel SPA and the type 2 subpixel SPB may be similarly configured. However, there is a difference due to the presence or absence of an organic light-emitting diode OLED.

A plurality of type 1 subpixels SPA may be disposed (for example, arranged in a matrix) in the active area AA, and a plurality of type 2 subpixels SPB may be sequentially disposed (for example, arranged in a line) in the non-active area NA. The type 2 subpixels SPB may be disposed one by one in a horizontal direction along a scan line. In some aspects, the type 2 subpixels SPB may be disposed on one side of the non-active area NA.

Figure 7:
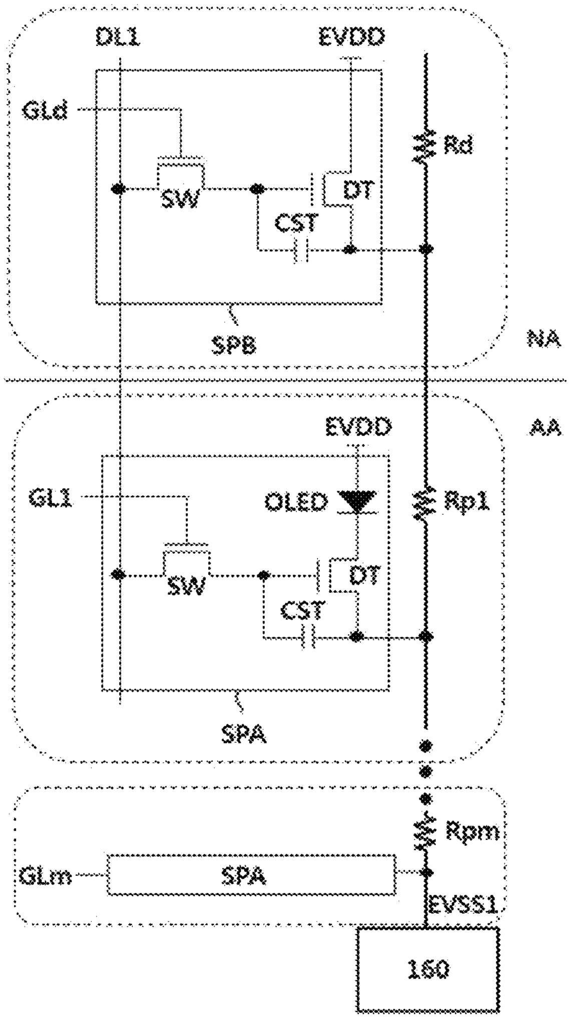
FIGS. 7 and 8 are diagrams for describing a sensing method of a low-potential voltage line using a type 1 subpixel, a type 2 subpixel, and a sensing circuit according to the first aspect of the present disclosure.
Figure 8:
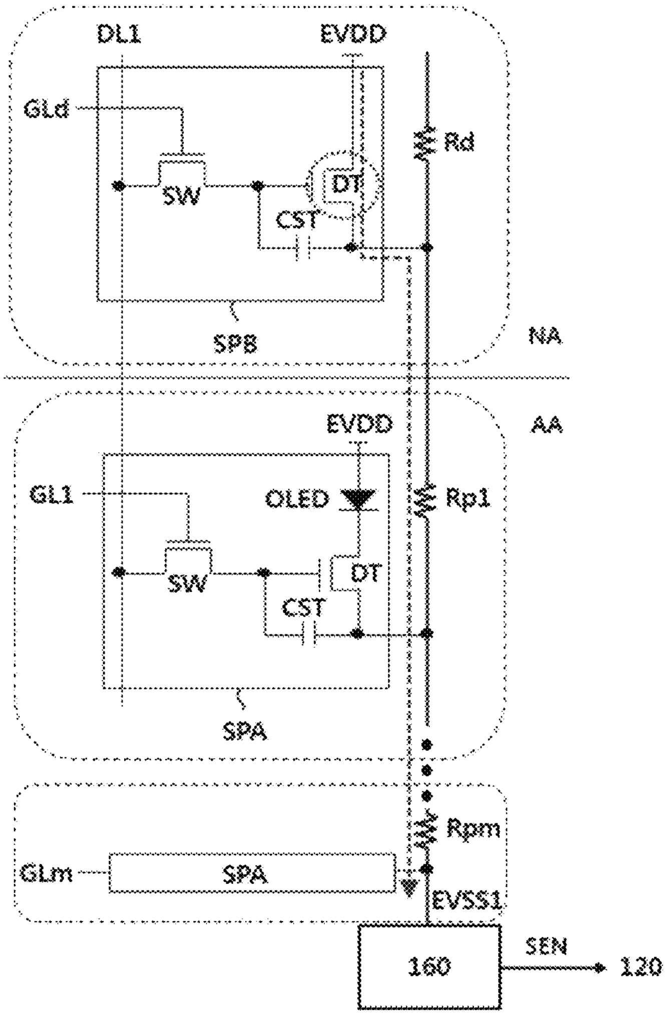
Figure 9:
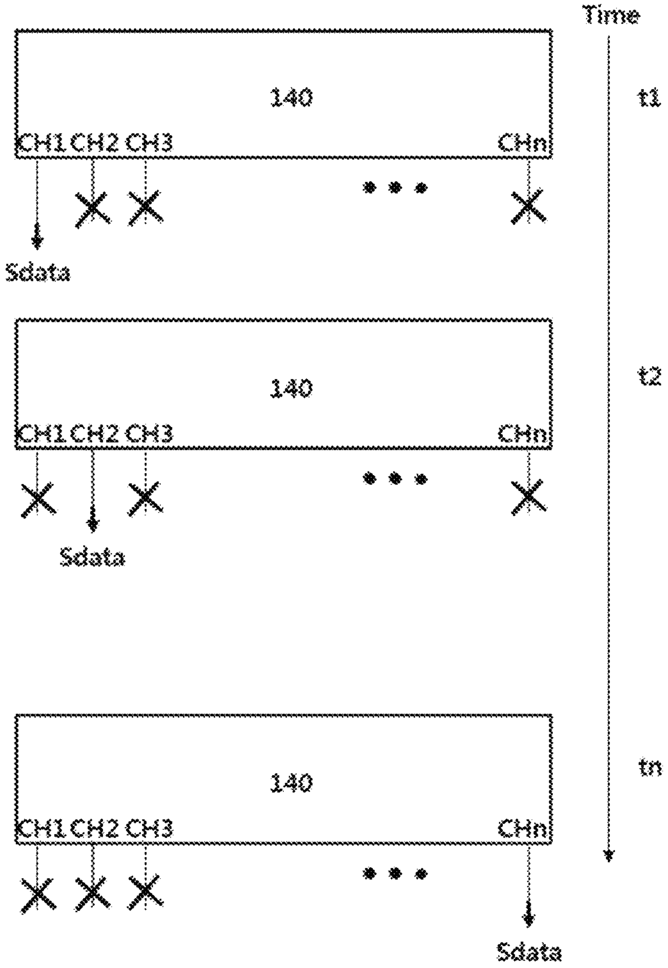
FIG. 9 is a diagram for describing a sensing data voltage output sequence of a data driver according to the first aspect of the present disclosure.
Figure 10:
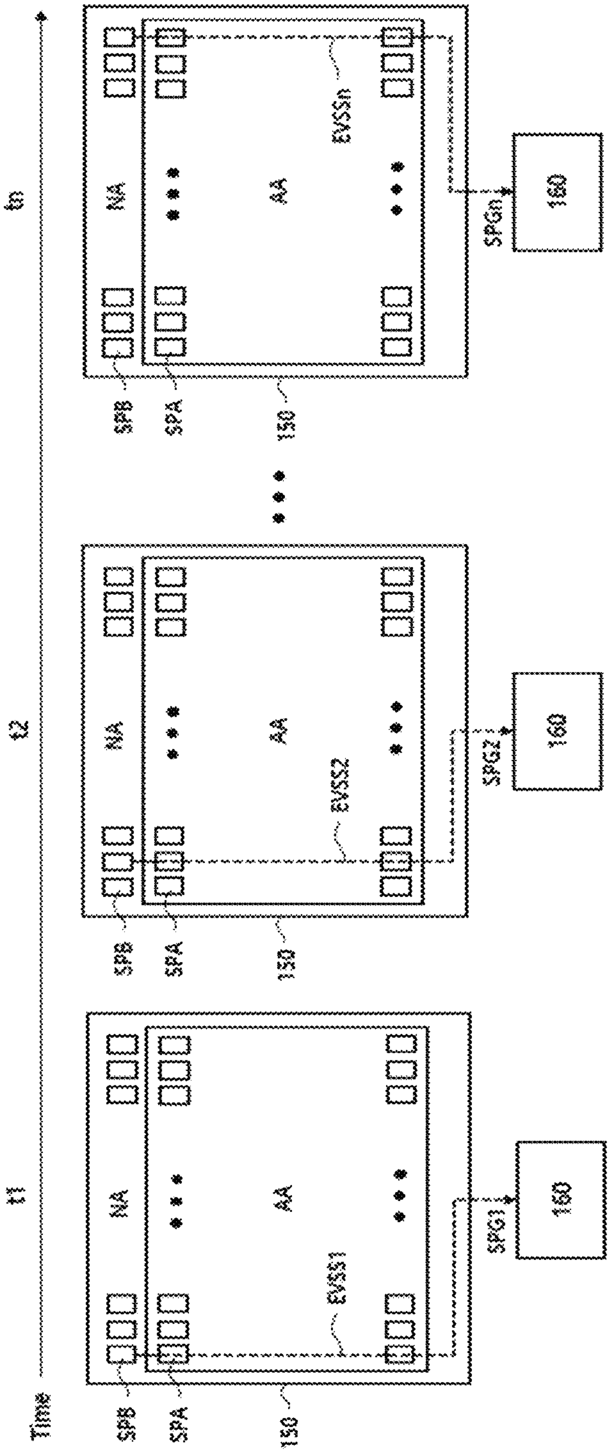
FIG. 10 is a diagram for describing a sensing sequence of the low-potential voltage line according to the first aspect of the present disclosure.

FIGS. 7 and 8 are diagrams for describing a sensing method of a low-potential voltage line using the type 1 subpixel, the type 2 subpixel, and a sensing circuit according to the first aspect of the present disclosure, FIG. 9 is a diagram for describing a sensing a data voltage output from a data driver according to the first aspect of the present disclosure, and FIG. 10 is a diagram for describing a sensing the low-potential voltage line according to the first aspect of the present disclosure.

As illustrated in FIG. 7, the type 1 subpixel SPA is connected to a first gate line GL1 to an Mth gate line GLm and may be located in the active area AA. In addition, the type 2 subpixel SPB connected to a dummy gate line GLd and may be located in the non-active area NA.

The type 2 subpixel SPB connected to the dummy gate line GLd may receive a scan signal before the type 1 subpixel SPA connected to the first gate line GL1. When scan signals are sequentially applied, the type 2 subpixels SPB may operate first, and then the type 1 subpixels SPA may operate. Then, operations of the type 1 subpixels SPA connected to the second gate line to the Mth gate line GLm may be sequentially performed.

The type 2 subpixel SPB and the plurality of type 1 subpixels SPA illustrated in FIG. 7 are disposed in the vertical direction and may all be commonly connected to the first data line DL1 and the first low-potential voltage line EVSS1.

As illustrated in FIG. 8, when a dummy scan signal is applied through the dummy gate line GLd and a sensing data voltage is applied through the first data line DL1, the driving transistor DT of the type 2 subpixel SPB may be turned on.

The organic light-emitting diode is not included inside the type 2 subpixel SPB and the high-potential voltage applied through the high-potential voltage line EVDD may be applied to the first low-potential voltage line EVSS1 by passing through the driving transistor DT. In addition, a driving current generated in response to turn-on operation of the driving transistor DT may flow to the first low-potential voltage line EVSS1. Accordingly, a sensing circuit 160 may sense a voltage or current applied to the first low-potential voltage line EVSS1.

The first low-potential voltage line EVSS1 is diposed in the vertical direction and may have parasitic wiring resistance for each position. For example, the first low-potential voltage line EVSS1 adjacent to the type 2 subpixel SPB may have a dummy wiring resistance Rd, and the first low-potential voltage line EVSS1 adjacent to the plurality of type 1 subpixels SPA may have first wiring resistance Rp1 to Mth wiring resistance Rpm.

The sensing circuit 160 may sense a voltage or current change that corresponds to the parasitic wiring resistance through the first low-potential voltage line EVSS1. The voltage or current delivered to the first low-potential voltage line EVSS1 is output through the type 2 subpixel SPB, and effect thereof is insignificant. Therefore, the sensing circuit 160 is configured to exclude an influence of the dummy wiring resistance Rd and sense the voltage or current change corresponding to the first wiring resistance Rp1 to the Mth wiring resistance Rpm.

In some aspects, the first wiring resistance Rp1 to the Mth wiring resistance Rpm ideally all have the same parasitic resistance. However, there may be the parasitic resistance deviates due to process deviation and other factors. In a structure such as the type 1 subpixel SPA, display quality may be uniform when a constant low-potential voltage is applied through the first low-potential voltage line EVSS1 at all positions. However, the low-potential voltage applied through the first low-potential voltage line EVSS1 varies by position (or area) in response to the first wiring resistance Rp1 to the Mth wiring resistance Rpm and resistance deviations thereof. In addition, the low-potential voltage applied through the first low-potential voltage line EVSS1 may increase as a distance to an input side to which the low-potential voltage is applied increases.

The sensing circuit 160 may determine the amount of change in the low-potential voltage according to the influence of current resistance (e.g., IR) for each position of the type 1 subpixel SPA in response to the first wiring resistances Rp1 to the Mth wiring resistances Rpm and resistance deviations thereof by sensing the voltage or current applied through the first low-potential voltage line EVSS1. The sensing circuit 160 may supply the timing controller 120 with a sensed value SEN corresponding to a change in the low-potential voltage according to the influence of the IR for each position of the type 1 subpixel SPA. Further, the timing controller 120 may compensate and output a data signal in response to a change in the low-potential voltage according to the influence of the IR for each position of the type 1 subpixel SPA based on the sensed value SEN. That is, the timing controller 120 may compensate the data signal by considering that the low-potential voltage increases as the distance to the input side increases based on the sensed value SEN.

As illustrated in FIGS. 8 to 10, the data driver 140 may include a first data channel CH1 to an Nth data channel CHn. As described with reference to FIG. 6, the first aspect of the present disclosure may compensate a data signal in response to a change in the low-potential voltage according to the influence of the current resistance for each position of the type 1 subpixel SPA based on interlocking of the sensing circuit 160 and the timing controller 120.

In some cases, the resistance deviation may occur in the entire display panel. In this case, it is preferable to sense all the low-potential voltage lines in the vertical direction on the entire display panel or to sense the low-potential voltage lines for each area. FIGS. 9 and 10 illustrate that the type 2 subpixels SPB disposed in a line in the non-active area are sequentially driven, sensing data voltages Sdata are sequentially output through all the channels CH1 to CHn, and sensing data voltages Sdata are then sensed.

For example, when the first type 2 subpixel SPB is operated by the sensing data voltage Sdata output through the first data channel CH1 during a first time t1, the sensing circuit 160 may sense the first low-potential voltage line EVSS1 to obtain a change in the low-potential voltage for each position of a first subpixel group SPG1, which are disposed in the vertical direction.

Next, when the second type 2 subpixel SPB is operated by the sensing data voltage Sdata output through the second data channel CH2 during a second time period t2, the sensing circuit 160 may sense the second low-potential voltage line EVSS2 to obtain a change in the low-potential voltage for each position of a second subpixel group SPG2, which are disposed in the vertical direction.

Then, in this order, when the last type 2 subpixel SPB is operated by the sensing data voltage Sdata output through the Nth data channel CHn during the Nth time tn, the sensing circuit 160 may sense the Nth low-potential voltage line EVSSn to obtain a change in low-potential voltage for each position of the Nth subpixel group SPGn, which are disposed in the vertical direction.

As may be seen from the above description, the sensing circuit 160 may sense one low-potential voltage line at a time. However, when all the low-potential voltage lines on the display panel 150 are separated, a specific number of low-potential voltage lines may be sensed in a time-division manner when configured with a circuit such as a multiplexer.

Figure 11:
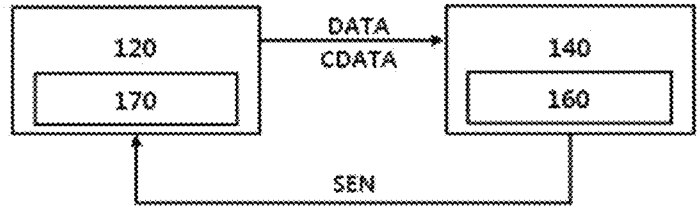
FIG. 11 is a diagram for describing a data driver having a sensing circuit and a timing controller having a compensation circuit according to the first aspect of the present disclosure.
Figure 12:
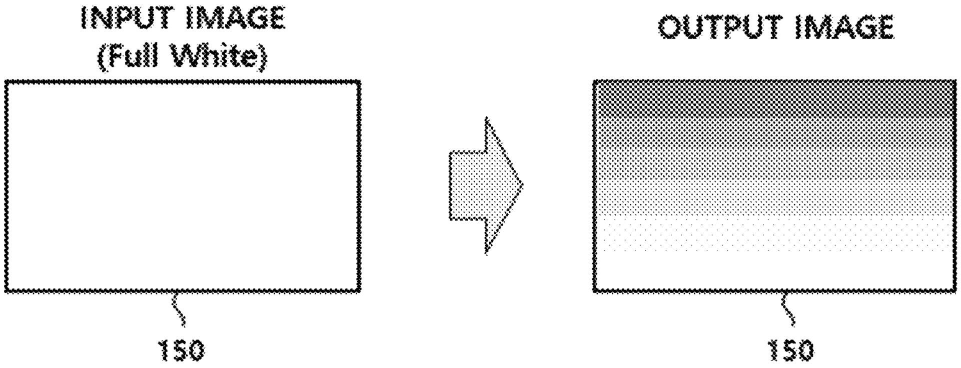
FIGS. 12 and 13 are diagrams for describing advantages of the first aspect of the present disclosure.
Figure 13:
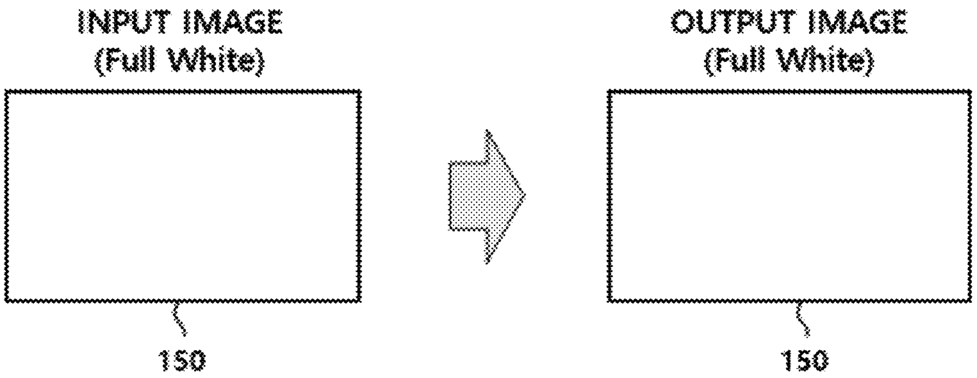

FIG. 11 is a diagram for describing a data driver having a sensing circuit and a timing controller having a compensation circuit according to the first aspect of the present disclosure, and FIGS. 12 and 13 are diagrams for describing advantages of the first aspect of the present disclosure.

As illustrated in FIG. 11, the sensing circuit 160 may be included in the data driver 140. In addition, the sensed value SEN corresponding to the change in the low-potential voltage based on current resistance for each position of the type 1 subpixel SPA may be supplied to the timing controller 120. In addition, the compensation circuit 170 may be included in the timing controller and is configured to compensate the data signal based on the change in the low-potential voltage due to the influence of the current resistance for each position of the type 1 subpixel SPA, which is detected based on the sensed value SEN. The timing controller 120 may supply a data signal DATA or a compensation data signal CDATA to the data driver 140 based on the presence or absence of compensation.

As illustrated in FIG. 12, a display device according to an experimental example is unable to compensate for a change in low-potential voltage due to the influence of the current resistance for each position of the subpixels included in the display panel 150. As a result, when an input image is full white and is supplied to the display panel 150, the display device in this case may display an output image having a luminance deviation that appears as a gradient.

As illustrated in FIG. 13, the display device according to the first aspect may compensate for a change in low-potential voltage due to the influence of the IR for each position of the subpixels included in the display panel 150. As a result, when an input image is full white and is supplied to the display panel 150, the display device according to the first aspect may display an output image that is full white that is similar to or identical to the input image. That is, the display device according to the first aspect may compensate for the change in low-potential voltage according to the influence of the current resistance for each position of the subpixels to provide a uniform display quality throughout the display panel 150.

Figure 14:
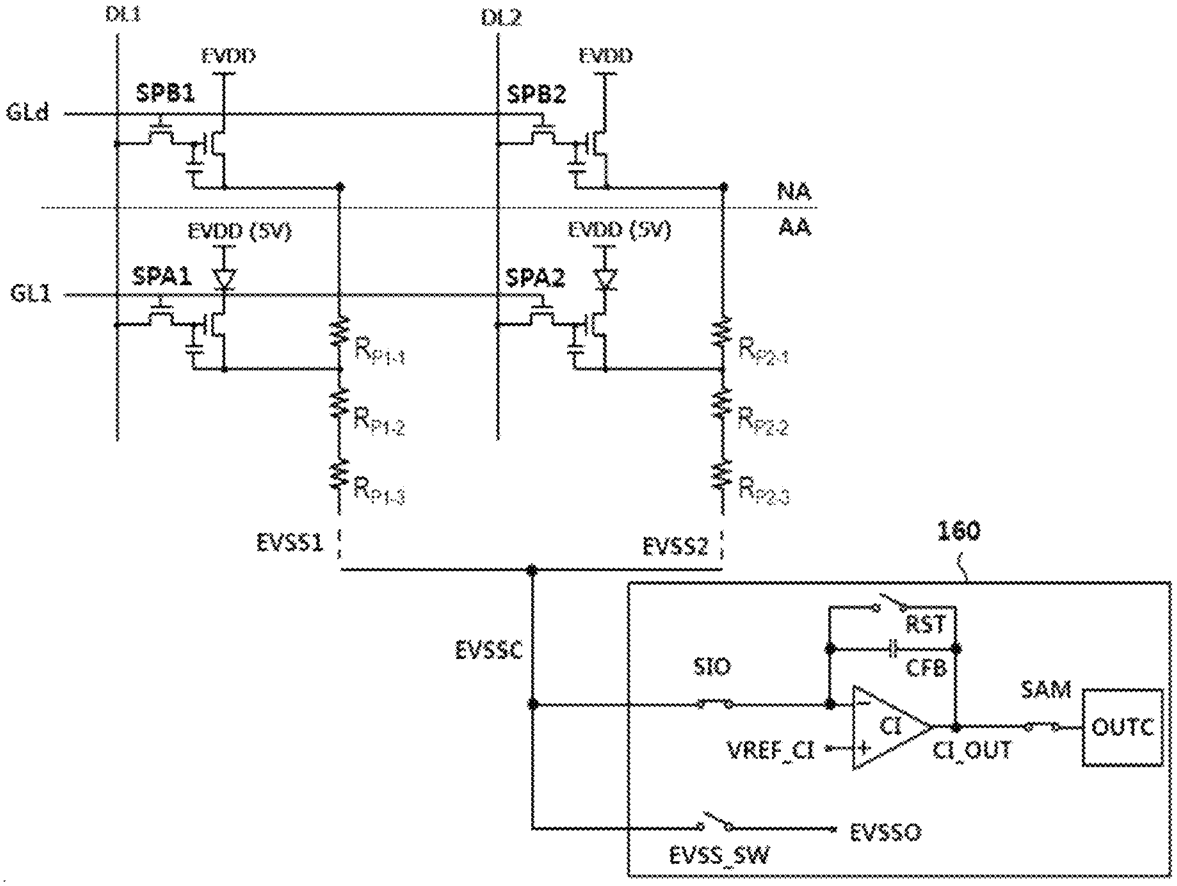
FIG. 14 is a diagram specifically illustrating a sensing circuit according to a second aspect of the present disclosure.
Figure 15:
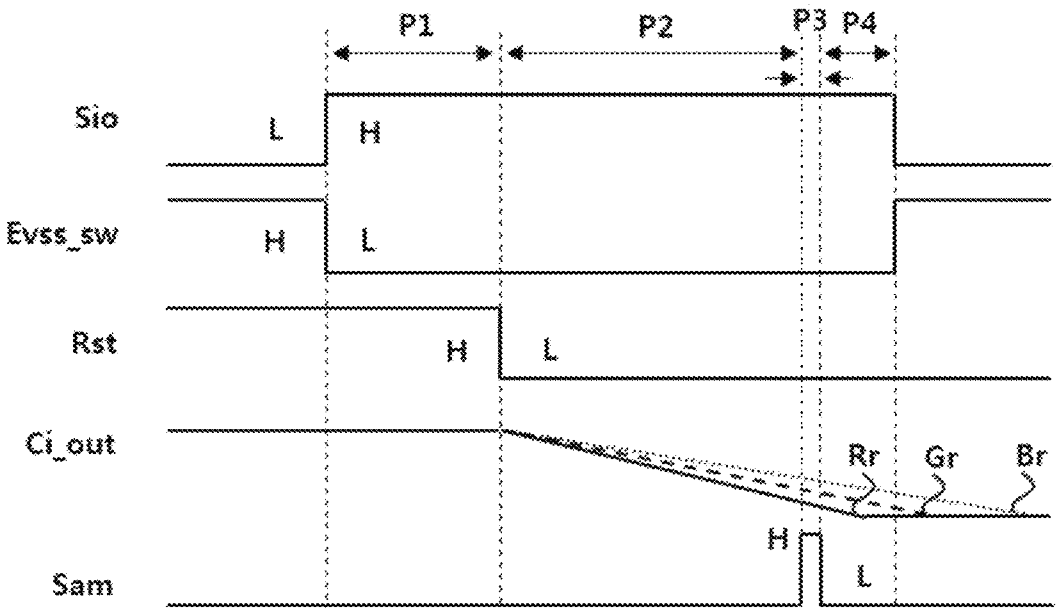
FIG. 15 is a waveform diagram for describing an operation of the sensing circuit illustrated in FIG. 14 according to the second aspect of the present disclosure.
Figure 16:
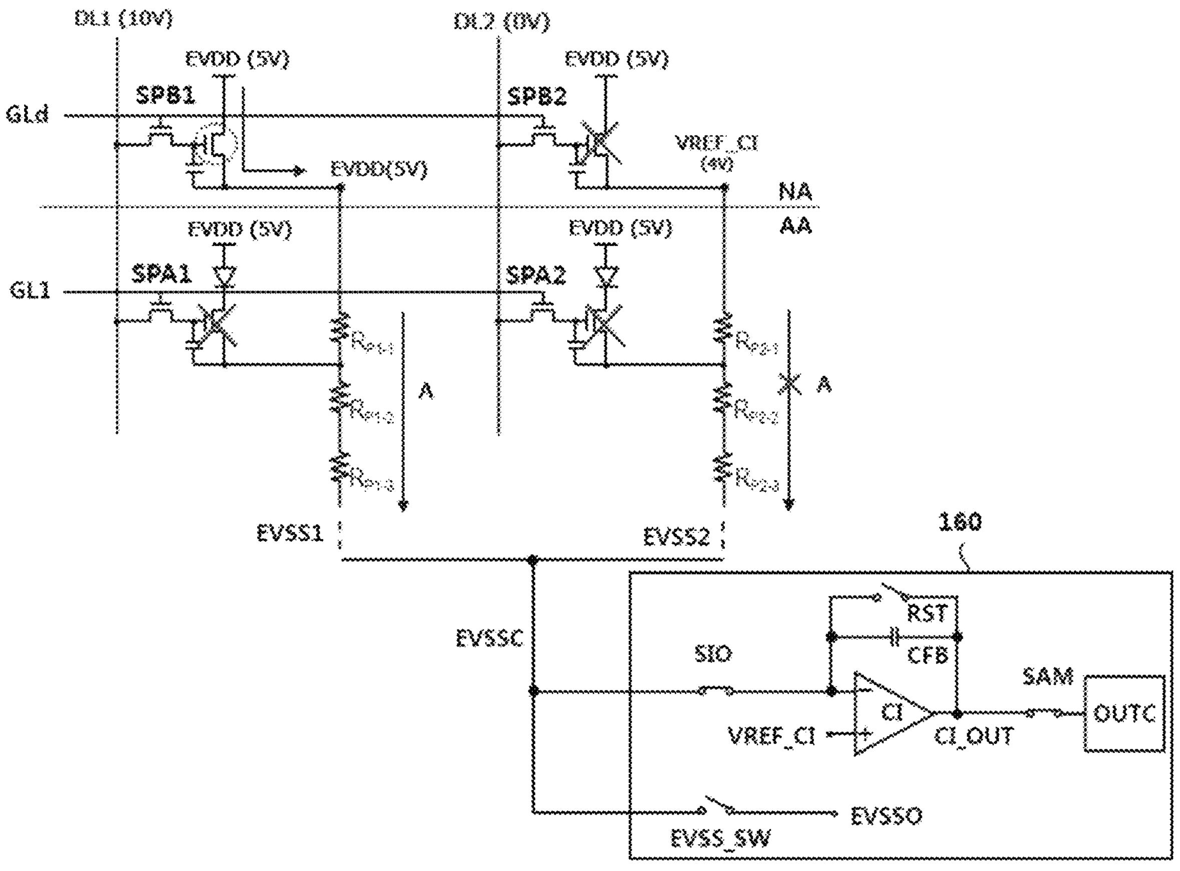
FIGS. 16 and 17 are diagrams for describing sensing and compensation of a display panel according to the second aspect of the present disclosure.
Figure 17:
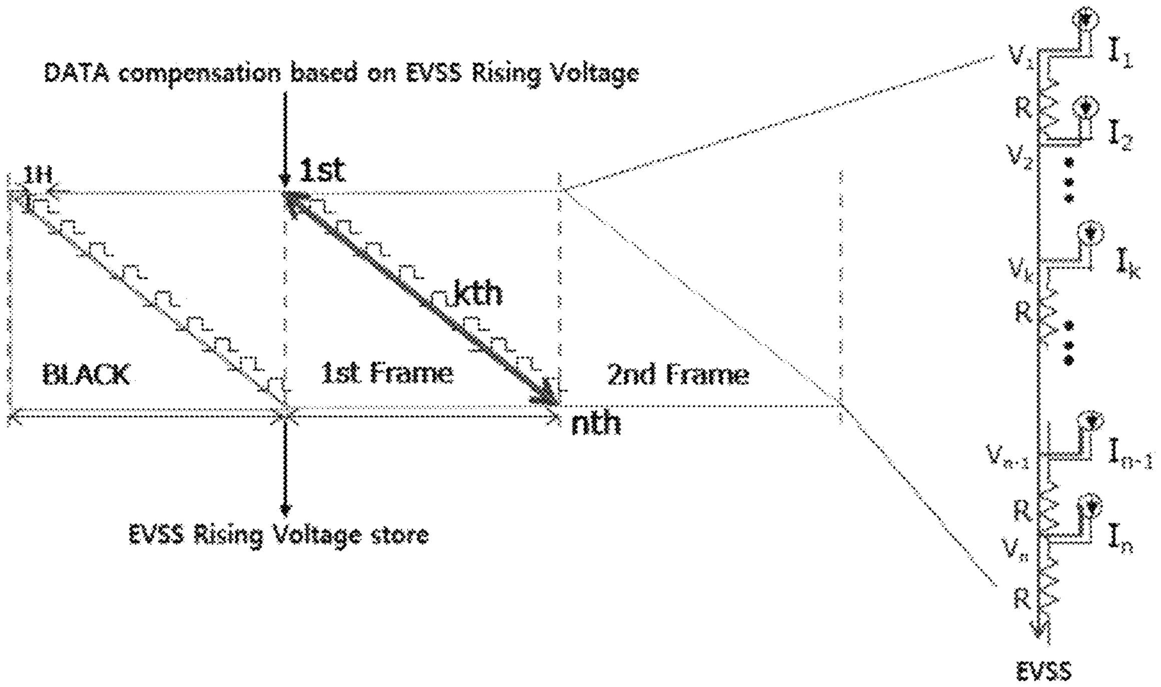

FIG. 14 is a diagram specifically illustrating a sensing circuit according to a second aspect of the present disclosure, FIG. 15 is a waveform diagram for describing an operation of the sensing circuit illustrated in FIG. 14 according to the second aspect of the present disclosure, and FIGS. 16 and 17 are diagrams for describing sensing and compensation of a display panel according to the second aspect of the present disclosure.

As illustrated in FIGS. 14 and 15, the sensing circuit 160 includes a first switch SIO, a second switch RST, an amplifier CI, a sensing capacitor CFB, a third switch SAM, a fourth switch EVSS_SW, an output circuit OUTC, etc. In the sensing circuit 160, the first switch SIO, the second switch RST, the amplifier CI, and the sensing capacitor CFB may be configured in an IC that capable of integrating a sensed current. In addition, even though the fourth switch EVSS_SW is included in the sensing circuit 160 as an example, the fourth switch EVSS_SW may be included in a display panel, a printed circuit board, a power supply, etc.

The first switch SIO may have a first electrode connected to a common low-potential voltage line EVSSC, a second electrode connected to an inverting terminal (−) of the amplifier CI, and a control electrode connected to a first control signal line. The first switch SIO may be turned on when a first control signal Sio comprises a high voltage H is applied to the first control signal line and turned off when the first control signal Sio comprises a low voltage L. When the first switch SIO is turned on, the integration circuit is configured to integrate the sensed current based on the sensing capacitor CFB.

The second switch RST may have a first electrode connected to the inverting terminal (−) of the amplifier CI, a second electrode connected to an output terminal of the amplifier CI, and a control electrode connected to a second control signal line. The second switch RST may be turned on when a second control signal Rst comprises a high voltage H and is applied to the second control signal line, and turned off when the second control signal Rst comprises a low voltage L. When the second switch RST is turned on, the integration circuit may initialize a current integrated in the sensing capacitor CFB.

The third switch SAM may have a first electrode connected to the output terminal of the amplifier CI, a second electrode connected to the output circuit OUTC, and a control electrode connected to a third control signal line. The third switch SAM may be turned on when a third control signal Sam having a high voltage H is applied to the third control signal line and turned off when the third control signal Sam comprises a low voltage L. When the third switch SAM is turned on, a current integrated by the integration circuit may be delivered to the output circuit OUTC.

The fourth switch EVSS_SW may have a first electrode connected to a low-potential voltage common line EVSSC, a second electrode connected to a low-potential voltage supply line EVSSO, and a control electrode connected to a fourth control signal line. The fourth switch EVSS_SW may be turned on when a fourth control signal Evss_sw comprises a high voltage H and is applied to the fourth control signal line, and turned off when the fourth control signal Evss_sw at a low voltage L. When the fourth switch EVSS_SW is turned on, the low-potential voltage common line EVSSC may deliver a low-potential voltage applied through the low-potential voltage supply line EVSSO to the first low-potential voltage line EVSS1 and the second low-potential voltage line EVSS2. In contrast, when the fourth switch EVSS_SW is turned off, the low-potential voltage common line EVSSC may sense a low-potential voltage line disposed on the display panel, such as the first low-potential voltage line EVSS1 or the second low-potential voltage line EVSS2 by being connected to the inverting terminal (−) of the amplifier CI. In other words, when the fourth switch EVSS_SW is turned on, a low-potential voltage may be applied to a low-potential voltage line disposed on the display panel, such as the first low-potential voltage line EVSS1 or the second low-potential voltage line EVSS2. However, when the fourth switch EVSS_SW is turned off, the low-potential voltage applied to the low-potential voltage line disposed on the display panel, such as the first low-potential voltage line EVSS1 or the second low-potential voltage line EVSS2 may be cut off (impeded).

As illustrated in FIGS. 14 and 15, during a first period P1, the first switch SIO and the second switch RST may be turned on, and the third switch SAM and the fourth switch EVSS_SW may be turned off. The first period P1 corresponds to a reset period of the sensing circuit 160. During the first period P1, the low-potential voltage common line EVSSC may be initialized by a reference voltage VREF_CI applied to a non-inverting terminal (+) of the amplifier CI.

During a second period P2, the first switch SIO may be turned on, and the second switch RST, the third switch SAM, and the fourth switch EVSS_SW may be turned off. The second period P2 corresponds to a sensing period of the sensing circuit 160. During the second period P2, a current sensed from the first low-potential voltage line EVSS1 may be transferred to the low-potential voltage common line EVSSC, and the integration circuit may integrate the current. At this time, output Ci_out of the integration circuit may gradually drop in response to the integrated current.

During a third period P3, the first switch SIO and the third switch SAM may be turned on, and the second switch RST and the fourth switch EVSS_SW may be turned off. The third period P3 corresponds to a sampling period of the sensing circuit 160. During the third period P3, the output circuit OUTC may sample the output Ci_out of the integration circuit.

Meanwhile, in FIG. 15, note that Rr, Gr, and Br illustrate that a change in low-potential voltage for a red subpixel, a change in low-potential voltage for a green subpixel, and a change in low-potential voltage for a blue subpixel may be sensed based on an operation of the sensing circuit 160.

As illustrated in FIG. 16, a first sensing data voltage (e.g., 10 V) may be applied through the first data line DL1, and a second sensing data voltage or black data voltage (e.g., 0 V) may be applied through the second data line DL2. In addition, a dummy scan signal corresponding to a high voltage may be applied through the dummy gate line GLd, and a scan signal corresponding to a low voltage may be applied to the first gate line GL1.

When the type 2 subpixels SPB1 and SPB2 and the type 1 subpixels SPA1 and SPA2 operate under the above conditions, the driving transistor of the type 2 subpixel SPB1 connected to the first data line DL1 is turned on, while the driving transistor of the second type subpixel SPB2 connected to the second data line DL2 may be turned off.

Accordingly a current A is applied through the high-potential voltage line EVDD and may flow in the first low-potential voltage line EVSS1. In this case, the sensing circuit 160 may sense the current A flowing through the first low-potential voltage line EVSS1 based on the operation described with reference to FIGS. 14 and 15. As described above, the current A sensed by the sensing circuit 160 may change in response to positional wiring resistance Rp1-1, Rp1-2, Rp1-3, . . . formed in the first low-potential voltage line EVSS1.

On the other hand, a condition that a voltage and the current A applied through the high-potential voltage line EVDD may flow does not occur in the second low-potential voltage line EVSS2, and thus the second low-potential voltage line EVSS2 may be charged with the reference voltage VREF_CI that is applied to the non-inverting terminal (+) of the amplifier CI.

In the same manner as above, after sensing of the first low-potential voltage line EVSS1 is completed, sensing of the second low-potential voltage line EVSS2 to the Nth low-potential voltage line may be sequentially performed.

As illustrated in FIG. 17, according to the second aspect of the present disclosure, during a first frame 1st Frame, a low-potential voltage rise for each position of the low-potential voltage line may be sensed and stored (EVSS Rising Voltage store). In addition, during a second frame 2nd Frame, the data signal may be compensated (DATA compensation based on EVSS Rising Voltage) based on a compensation voltage equation for the low-potential voltage rise for each position of the low-potential voltage line.

In addition, according to the second aspect of the present disclosure, during a period of displaying an ineffective image (for example, a screen saver image), not an effective image, on the display panel, such as a frame BLACK of displaying a black image, or a blank period, the low-potential voltage rise for each position of the low-potential voltage line may be sensed and stored.

The current and voltage flowing through the low-potential voltage line EVSS may be affected by the wiring resistance, which may be expressed in the form of an equivalent circuit on the right side of FIG. 17 when illustrated from the first line 1st to the Nth line Nth.

According to the second aspect of the present disclosure, a voltage rise for the low-potential voltage line from the first line 1st to the Nth line Nth is sensed during the first frame, and a compensation voltage equation may be prepared to compensate the voltage rise, which may be expressed as the following table.

TABLE 1

| Sensing voltage equations of low-potential voltage line from first line 1st to Nth line Nth | Compensation voltage equations of low-potential voltage line from first line 1st to Nth line Nth |
|---|---|
| $V_1 = V_2 + IS_1 * R = \sum_{k=1}^{n} IS_k * R$ | $V_1 = V_1'$ |
| $V_2 = V_3 + IS_2 * R = \sum_{k=2}^{n} IS_k * R$ | $V_2 = V_2' + (IS_1 - IS_1') * R * (n-1)$ |
| . . . | . . . |
| $V_k = V_{k+1} + IS_k * Rk = \sum_{k=k}^{n} IS_k * R$ | $V_k = V_k' + (Is_{k-1} - Is_{k-1}') * R * (n + 1 - k)$ |
| . . . | . . . |
| $V_{n-1} = V_n + IS_{n-1} * Rn - 1 = \sum_{k=n-1}^{n} IS_k * R$ | $V_{n-1} = V_{n-1}' + (IS_{n-2} - IS_{n-2}') * R * 2$ |
| $V_n = IS_n * R = IS_n * R$ | $V_n = V_n' + (IS_{n-1} - IS_{n-1}') * R$ |

In the above equation, V may denote a voltage of each subpixel in a current frame, and V' may denote a voltage of each subpixel in a previous frame. The term IS may denote a current variation value of each subpixel in the current frame, IS' may denote a current variation value of each subpixel in the previous frame, and R may denote wiring resistance of each subpixel.

In addition, when the compensation voltage equation for compensating for a rise of a voltage Vk for a Kth line Kth in the above equation is rearranged again, the equation may be expressed as follows.

$$V_k = \sum_{k=k}^{n} IS'_k * R + (Is_{k-1} - Is'_{k-1}) * R * (n + 1 - k)$$

In the above equation, Vk may denote a voltage of a subpixel of the Kth line in the current frame, IS'k may denote a current variation value of the subpixel of the Kth line in the previous frame, ISk-1 may denote a current variation value of a subpixel located one line before the Kth line in the current frame, and ISk-1' may denote a current variation value of a subpixel located one line before the Kth line in the previous frame.

The above equation is only intended to aid in understanding which compensation voltage equation may be used to compensate the data signal after sensing the low-potential voltage rise for each position of the low-potential voltage line. However, the present disclosure is not limited thereto.

Figure 18:
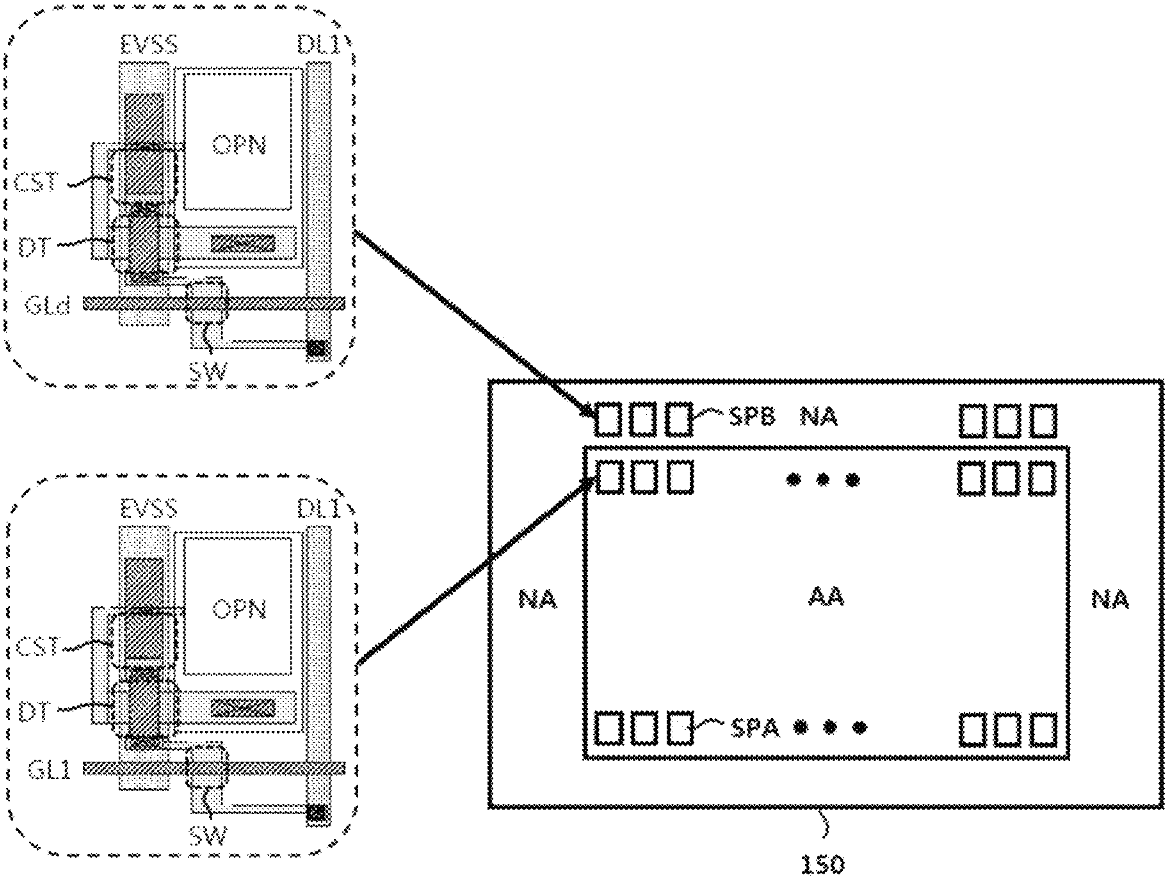
FIGS. 18 to 20 are illustrative diagrams illustrating cross-sectional structures of a type 1 subpixel and a type 2 subpixel according to a third aspect of the present disclosure.
Figure 19:
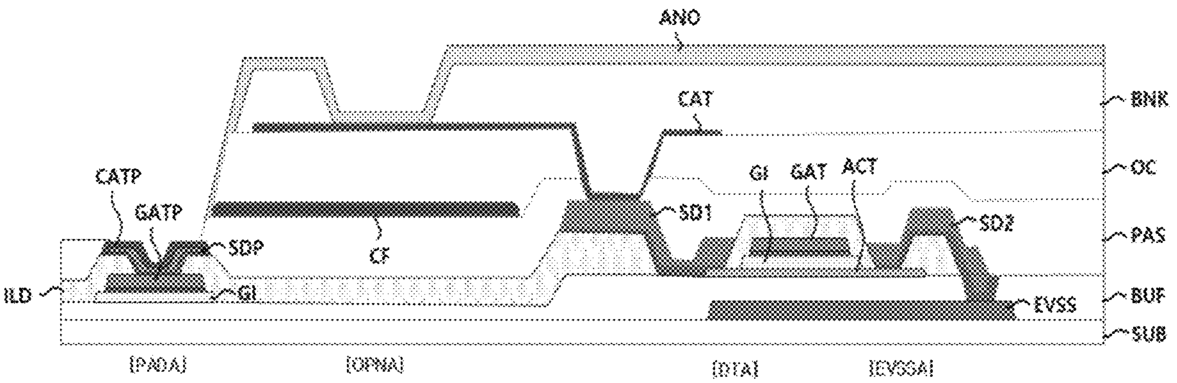
Figure 20:
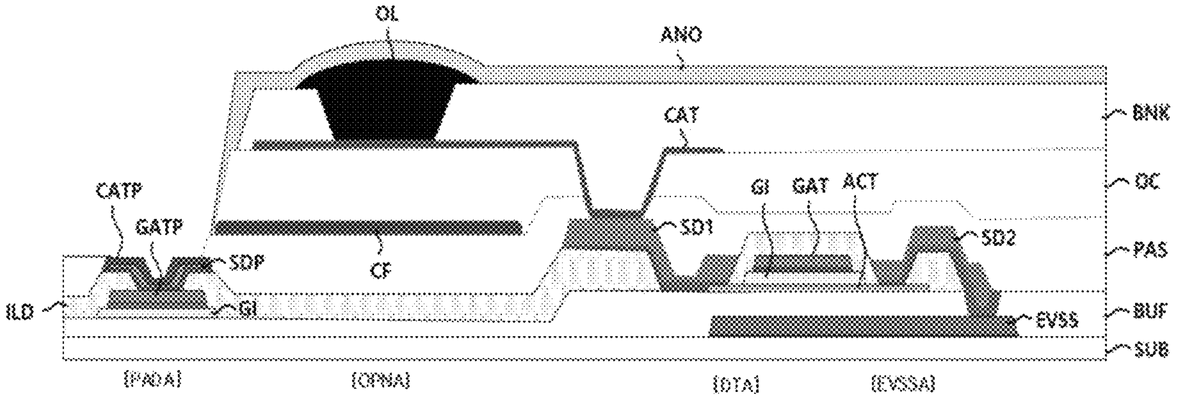

FIGS. 18 to 20 are illustrative diagrams illustrating cross-sectional structures of a type 1 subpixel and a type 2 subpixel according to an aspect of the present disclosure.

As illustrated in FIG. 18, in each of the type 1 subpixel SPA and the type 2 subpixel SPB, an opening area OPN may be configured between the low-potential voltage line EVSS and the first data line DL1. In addition, a capacitor CST and a driving transistor DT included therein may overlap the low-potential voltage line EVSS to increase the light-emitting area.

As illustrated in FIGS. 19 and 20, the type 1 subpixel SPA and the type 2 subpixel SPB may have the same structure except for the presence or absence of an organic light-emitting layer OL. A cross-sectional structure thereof will be described below.

A substrate SUB may include an area DTA where the driving transistor is formed, an area EVSSA where the low-potential voltage line is formed, an area OPNA where the opening area is formed, and an area PADA where a pad is formed thereon.

The low-potential voltage line EVSS may be located on the substrate SUB. The low-potential voltage line EVSS may be located in the area EVSSA where the low-potential voltage line is formed. A material capable of blocking light may be selected for the low-potential voltage line EVSS.

A buffer layer BUF may be located on the substrate SUB. The buffer layer BUF may be located in the area DTA where the driving transistor is formed, the area EVSSA where the low-potential voltage line is formed, the area OPNA where the opening area is formed, and the area PADA where the pad is formed. The buffer layer BUF may expose a part of the low-potential voltage line EVSS.

A semiconductor layer ACT may be formed on the buffer layer BUF. The semiconductor layer ACT may be located in the area DTA where the driving transistor is formed and the area EVSSA where the low-potential voltage line is formed. Non limiting examples of the semiconductor layer ACT include an oxide semiconductor, a silicon semiconductor, etc.

A gate insulating layer GI may be formed on the buffer layer BUF and the semiconductor layer ACT. The gate insulating layer GI may be located in the area PADA where the pad is formed, the area DTA where the driving transistor is formed, and the area EVSSA where the low-potential voltage line is formed. The gate insulating layer GI may be formed in an island shape. The gate insulating layer GI formed in the area DTA where the driving transistor is formed and the area EVSSA where the low-potential voltage line is formed and may expose a source region and a drain region of the semiconductor layer ACT.

Gate metal layers GAT and GATP may be formed on the gate insulating layer GI. The gate metal layers GAT and GATP may be located in the area PADA where the pad is formed, the area DTA where the driving transistor is formed, and the area EVSSA where the low-potential voltage line is formed. The gate metal layers GAT and GATP may be formed in an island shape. The gate metal layers GAT and GATP may be formed as multiple layers. The gate metal layer GATP located in the area PADA where the pad is formed may be configured as a lower pad electrode layer, and the gate metal layer GAT located in the area DTA where the driving transistor is formed and the area EVSSA where the low-potential voltage line is formed may be configured as a gate electrode layer.

An interlayer insulating layer ILD may be formed on the buffer layer BUF. The interlayer insulating layer ILD may be located in the area DTA where the driving transistor is formed, the area EVSSA where the low-potential voltage line is formed, the area OPNA where the opening area is formed, and the area PADA where the pad is formed. The interlayer insulating layer ILD may expose a part of the low-potential voltage line EVSS, a part of the source and drain regions of the semiconductor layer ACT, and a part of the lower pad electrode layer GATP.

Source-drain metal layers SD1, SD2, and SDP may be formed on a part of the low-potential voltage line EVSS, a part of the source and drain regions of the semiconductor layer ACT, and a part of the lower pad electrode layer GATP. The first source-drain metal layer SD1 may contact a part of the semiconductor layer ACT. The first source-drain metal layer SD1 may be configured as a first electrode of the driving transistor. The second source-drain metal layer SD2 may contact a part of the low-potential voltage line EVSS and another part of the semiconductor layer ACT. The second source-drain metal layer SD2 may be configured as a second electrode of the driving transistor. The third source-drain metal layer SDP may contact the lower pad electrode layer GATP. The third source-drain metal layer SDP may be configured as an upper pad electrode layer.

A protective layer PAS may be formed on the interlayer insulating layer ILD. The protective layer PAS may be located in the area DTA where the driving transistor is formed, the area EVSSA where the low-potential voltage line is formed, the area OPNA where the opening area is formed, and the area PADA where the pad is formed. The protective layer PAS may expose a part of the first source-drain metal layer SD1 and a part of the third source-drain metal layer SDP.

A color filter layer CF may be formed on the protective layer PAS. The color filter layer CF may be located in the area OPNA where the opening area is formed. The color filter layer CF may be selected to be red, green or blue.

An overcoat layer OC may be formed on the protective layer PAS. The overcoat layer OC may be located in the area DTA where the driving transistor is formed, the area EVSSA where the low-potential voltage line is formed, and the area OPNA where the opening area is formed. The overcoat layer OC may expose a part of the first source-drain metal layer SD1.

A cathode layer CAT may be formed on the overcoat layer OC. The cathode layer CAT may be located in the area OPNA where the opening area is formed and the area DTA where the driving transistor is formed. A transparent material having high light transmittance may be selected for the cathode layer CAT.

A bank layer BNK may be formed on the overcoat layer OC. The bank layer BNK may be located in the area DTA where the driving transistor is formed, the area EVSSA where the low-potential voltage line is formed, and the area OPNA where the opening area is formed. The bank layer BNK may expose a part of the cathode layer CAT in the area OPNA where the opening area is formed.

An anode layer ANO may be formed on the bank layer BNK. The anode layer ANO may be located in the area DTA where the driving transistor is formed, the area EVSSA where the low-potential voltage line is formed, and the area OPNA where the opening area is formed. An opaque material having excellent light blocking properties and low resistance may be selected for the anode layer ANO.

As illustrated in FIG. 19, in the type 2 subpixel SPB, the organic light-emitting layer OL is not located between the anode layer ANO and the cathode layer CAT. The anode layer ANO and the cathode layer CAT are are in electrical a contact and form a short-circuit, and the type 2 subpixel SPB may be incapable of emitting light. According to FIG. 19, the type 2 subpixel SPB is in a state in which only the anode layer ANO and the cathode layer CAT included in the organic light-emitting diode are formed, that is, only the electrodes are located.

As illustrated in FIG. 20, in the type 1 subpixel SPA, the organic light-emitting layer OL is located between the anode layer ANO and the cathode layer CAT. Accordingly, since the organic light-emitting layer OL is located therebetween, the type 1 subpixel SPA may be capable of emitting light. Meanwhile, the organic light-emitting layer OL may be formed based on an inkjet printing method, a deposition method, a thermal transfer method, etc. However, the present disclosure is not limited thereto.

As describe above, the present disclosure has an effect in which the amount of change in the low-potential voltage according to the influence of the current resistance for each position is detected using a method of performing sensing after applying the high-potential voltage to the low-potential voltage line through the subpixel incapable of emitting light, and the data signal is compensated based thereon, so that display quality of the entire display penal may be uniform. In addition, the present disclosure has an effect of sensing a current or voltage flowing through the low-potential voltage line, and minimizing a display quality deterioration caused by resistance deviation due to process deviation based thereon.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:

a first subpixel configured to emit light and a second subpixel;

a high-potential voltage line connected to the first subpixel and the second subpixel to deliver a high-potential voltage;

a low-potential voltage line connected to the first subpixel and the second subpixel configured to deliver a low-potential voltage; and a circuit connected to the low-potential voltage line and configured to sense a value corresponding to the low-potential voltage line during operation of the second subpixel and compensate for a data signal to be supplied to the first subpixel based on the value.

2. The display device according to claim 1, wherein the second subpixel comprises an anode layer and a cathode layer included in an organic light-emitting diode that are short-circuited.

3. The display device according to claim 2, wherein the second subpixel includes a driving transistor configured to turned on in response to a sensing data voltage and a dummy scan signal.

4. The display device according to claim 3, wherein, when the driving transistor is turned on, the high-potential voltage applied through the high-potential voltage line is coupled to the low-potential voltage line.

5. The display device according to claim 1, wherein the second subpixel is located in a non-active area of a display panel and a plurality of second subpixels are arranged in a line in a direction of a gate line.

6. The display device according to claim 1, wherein the circuit is configured to compensate for the data signal in response to an amount of change in the low-potential voltage according to current resistance for each position of a display panel based on the value.

7. The display device according to claim 6, wherein, during a sensing operation of the circuit, instead of the low-potential voltage applied through the low-potential voltage line being blocked, the high-potential voltage applied through the second subpixel is transferred through the low-potential voltage line.

8. A method of driving a display device, the method comprising:

applying a sensing data voltage and a dummy scan signal to a second subpixel of a display panel;

sensing, using a sensing circuit, a value of a low-potential voltage line connected to the a first subpixel and the second subpixel; and compensating for a data signal to be supplied to the first subpixel based on the value sensed on the low-potential voltage line.

9. The method according to claim 8, wherein, during a sensing operation of the sensing circuit, instead of the low-potential voltage applied through the low-potential voltage line being blocked, a high-potential voltage applied through the second subpixel is transferred through the low-potential voltage line.

10. The method according to claim 9, wherein the compensating comprises compensating for the data signal in response to an amount of change in the low-potential voltage according to an influence of current resistance for each position of the display panel based on the sensed value.

11. A display device comprising:

a subpixel in a display area and configured to emit light based on a high-potential voltage line and a low-potential voltage line;

a parasitic calibration circuit in a non-display area and configured to apply a voltage to the low-potential voltage line; and a sensing circuit connected to the low-potential voltage line and configured to sense a value corresponding to the low-potential voltage line during operation of the parasitic calibration circuit and compensate for a data signal to be supplied to the subpixel based on the value.

12. The display device of claim 11, wherein the parasitic calibration circuit is formed based on processes for depositing materials of the subpixel.

13. The display device of claim 12, wherein an organic material is not deposited in the parasitic calibration circuit to create a low impedance path.

14. The display device of claim 11, wherein the parasitic calibration circuit comprises a driving transistor, a storage capacitor, and a gate driving switch.

15. The display device of claim 14, further comprising:

a gate line connecting the parasitic calibration circuit to a timing controller for turning on the parasitic calibration circuit before turning on the subpixel.

16. The display device of claim 15, wherein the sensing circuit is coupled to the timing controller for compensating for a deviation in a parasitic resistance associated with the subpixel.

* * * * *